(12) United States Patent
Sawaya et al.

(10) Patent No.: US 11,830,252 B1
(45) Date of Patent: Nov. 28, 2023

(54) VIDEO AND AUDIO ANALYTICS FOR EVENT-DRIVEN VOICE-DOWN DETERRENTS

(71) Applicant: The ADT Security Corporation, Boca Raton, FL (US)

(72) Inventors: Philippe Sawaya, Boca Raton, FL (US); Candace Brown, Boca Raton, FL (US); Amy Cooper, Boca Raton, FL (US); Tarmily Wen, Boca Raton, FL (US); Andrew O'Connor, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/193,775

(22) Filed: Mar. 31, 2023

(51) Int. Cl.
  *G06V 20/52* (2022.01)
  *G06V 20/40* (2022.01)
  *G06V 10/70* (2022.01)
  *G06V 40/10* (2022.01)
  *G08B 13/196* (2006.01)

(52) U.S. Cl.
  CPC .............. *G06V 20/52* (2022.01); *G06V 10/70* (2022.01); *G06V 20/44* (2022.01); *G06V 40/10* (2022.01); *G08B 13/196* (2013.01)

(58) Field of Classification Search
  CPC ........ G06V 20/52; G06V 10/70; G06V 40/10; G06V 20/44; G08B 13/196
  USPC ........................................................ 382/103
  See application file for complete search history.

(56) References Cited

U.S. PATENT DOCUMENTS

| 10,043,360 | B1* | 8/2018 | Mullins | G08B 13/1968 |
|---|---|---|---|---|
| 10,937,289 | B2 | 3/2021 | King et al. | |
| 11,017,218 | B2 | 5/2021 | Moriya | |
| 2014/0362225 | A1 | 12/2014 | Ramalingamoorthy et al. | |
| 2019/0088096 | A1* | 3/2019 | King | G08B 13/19665 |
| 2019/0282000 | A1* | 9/2019 | Swafford | A47F 10/02 |
| 2020/0079412 | A1 | 3/2020 | Ramanathan et al. | |
| 2020/0117407 | A1* | 4/2020 | Yoshimura | G06F 3/121 |
| 2020/0211343 | A1 | 7/2020 | Mullins | |
| 2020/0364999 | A1 | 11/2020 | Mullins | |
| 2022/0027637 | A1* | 1/2022 | Madden | B64C 39/024 |

* cited by examiner

*Primary Examiner* — Kenny A Cese
(74) *Attorney, Agent, or Firm* — Christopher & Weisberg, P.A.

(57) ABSTRACT

A control device in a premises security system for a premises is provided. The control device is configured to receive video surveillance data associated with an area of the premises, identify, using at least one machine learning model, a triggering event based at least in part on the video surveillance data, identify, using the at least one machine learning model, and based at least in part on the video surveillance data, a person associated with the triggering event, identify, using the at least one machine learning model, at least one characteristic of the person associated with the triggering event, generate an audio message comprising content based at least in part on the at least one characteristic of the person associated with the triggering event, and cause playback of the audio message in the area of the premises.

18 Claims, 4 Drawing Sheets

VIDEO AND AUDIO ANALYTICS FOR EVENT-DRIVEN VOICE-DOWN DETERRENTS

TECHNICAL FIELD

The present technology is generally related to voice-down monitoring services for a premises security system.

BACKGROUND

In some existing monitoring services for premises security systems, "voice-down" (VD) messages may be configured, which may include a human monitoring agent connecting (e.g., via telephone) to a premises' public announcement (PA) or speaker system to play a pre-recorded message, or the human monitoring agent may be instructed to speak a scripted message, for example, stating that the premises site is being monitored. VD messages may be intended as a deterrent, and may typically be performed at a regular cadence or periodicity, e.g., hourly.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

The present disclosure relates to providing configurations and analytics for event-driven voice-down deterrents, as described herein.

Before describing in detail exemplary embodiments, it is noted that some embodiments may reside in combinations of apparatus components and processing steps related to configurations for supporting event-driven VD deterrents. Accordingly, components may be represented where appropriate by conventional symbols in the drawings, focusing on details that facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

In embodiments described herein, the joining term "in communication with," and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible for achieving the electrical and data communication. In some embodiments described herein, the term "coupled," "connected," and the like, may be used herein to indicate a connection, although not necessarily directly, and may include wired and/or wireless connections.

The apparatuses, methods, devices, and systems described herein support configurations and analytics for event-driven voice-down deterrents.

Figure 1:
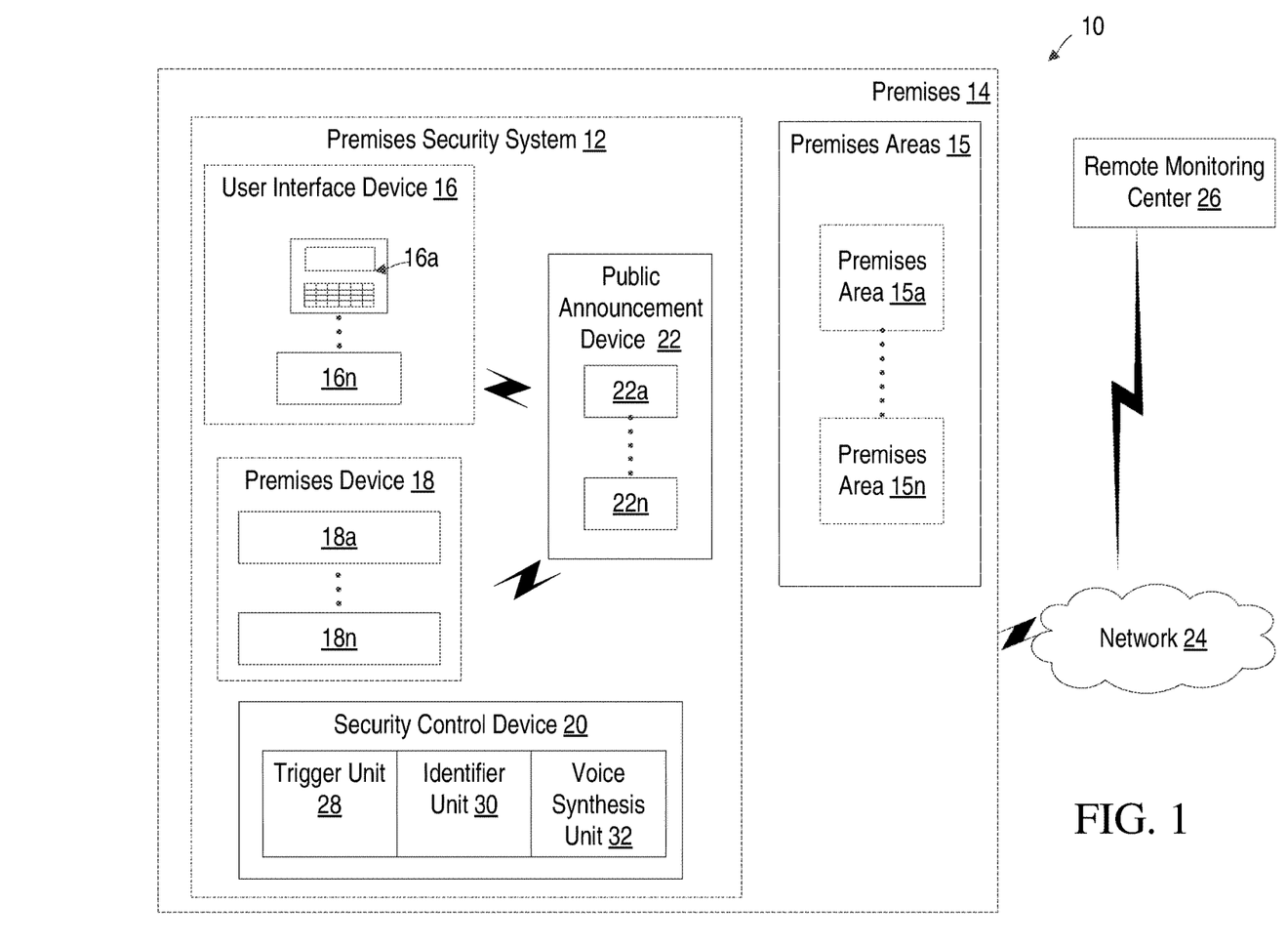
FIG. 1 is a diagram of an example system according to the principles of the present disclosure.

Referring now to the drawing figures in which like reference designators refer to like elements there is shown in FIG. 1 a system designated generally as "10." System 10 may include premises security system 12 that is configured to monitor premises 14, such as a retail store, shopping mall, concert venue, sports arena, medical facility, educational facility, prison, residence, etc. Premises 14 may include and/or may be associated with one or more premises areas 15a to 15n (collectively referred to as "premises areas 15"), such as rooms, floors, sections, etc., of premises 14. Premises security system 12 includes and/or is associated with one or more user interface devices 16a to 16n (collectively referred to as "user interface device 16"), one or more premises devices 18a to 18n (collectively referred to as "premises device 18"), security control device 20, and public announcement devices 22a to 22n (collectively referred to as "public announcement device 22"). System 10 may further include a network 24 and a remote monitoring center 26, communicating with each other or with at least one other entity in system 10.

User interface device 16 may be a wired or wireless device that allows a user (e.g., a retail store manager, building supervisor, security technician, law enforcement officer, etc.) to communicate with security control device 20. User interface device 16 may be a portable or fixed control keypad/interface 12a, computer, mobile phone and tablet, panel, touchscreen, etc., among other devices that allow a user to interface with security control device 20 and/or one or more premises devices 18. User interface device 16 may communicate at least with security control device 20 using one or more wired and/or wireless communication protocols well known to those of ordinary skill in the art. For example, portable control keypad 16a may communicate with security control device 20 via a ZigBee based communication link, e.g., network based on Institute of Electrical and Electronics Engineers (IEEE) 802.15.4 protocols, and/or Z-wave based communication link, or over the premises' local area network, e.g., network-based on IEEE 802.11 protocols.

Premises devices 18 may include one or more types of security and safety related sensors, control and/or devices configured to capture images, audio, and/or video. For example, the types of sensors may include various security or safety related sensors such as image sensors, audio sensors, motion sensors, infrared sensors, fire sensors, heat sensors, carbon monoxide sensors, contact sensors, among other sensor types that are known in the art. For example, premises devices 18 may correspond to a plurality of video surveillance cameras placed throughout a retail store. In some embodiments, premises devices 18 may further include, e.g., sensors for detecting theft, such as security tag sensors for detecting movement/location/proximity/etc. of sensors affixed to items for sale in the premises 14. Premises devices 18 may include, e.g., devices for capturing images and/or video for performing biometric recognition, facial recognition, or other types of recognition (voice recognition, gait recognition, etc.) of persons in premises 14. In some embodiments, the premises devices 18 may perform the biometric recognition in the device, while in other devices, the recognition processes may be performed elsewhere, e.g., in security control device 20, remote monitoring center 26, etc., which may be based on data/media communicated from premises devices 18.

A premises device 18 may communicate with security control device 20 via proprietary wireless communication protocols and may also use Wi-Fi. Other communication technologies can also be used, and the use of Wi-Fi is only for example purposes. For example, a premises device 18 may communicate with security control device 20 via a wired connection, or may use one or more network(s) 24 for communicating with security control device 20, remote monitoring center 26, etc.

Security control device 20 may provide one or more management functions and monitoring functions, analysis functions, control functions such as power management, premises device management and alarm management/analysis, among other functions to premises security system 12. In particular, security control device 20 may manage one or more security or safety features. Security control device 20 may communicate with network 24 via one or more communication links. In particular, the communications links may be broadband communication links such as a wired cable modem or Ethernet communication link, and digital cellular communication link, e.g., long term evolution (LTE) and/or 5G based link, among other broadband communication links known in the art. Broadband as used herein may refer to a communication link other than a plain old telephone service (POTS) line. Ethernet communication link may be an IEEE 802.3 or 802.11 based communication link. Network 24 may be a wide area network, local area network, wireless local network and metropolitan area network, among other networks known in the art. Network 24 may provide communications between security control device 20 and remote monitoring center 26.

Security control device 20 may include trigger unit 28, which is configured to perform one or more security control device 20 functions described herein, such as receiving sensor data from one or more premises devices 18, receiving other information from, e.g., user interface device 16, etc., and determining whether to trigger a voice-down event based on the received sensor data, other information from user interface device 16, configuration information, security configuration profiles, etc. Security control device 20 may include identifier unit 30, which is configured to perform one or more security control device 20 functions described herein, such as identifying one or more characteristics of a person and/or other objects, entities, etc. associated with the triggered voice-down event. Security control device 20 may include voice synthesis unit 32, which is configured to perform one or more security control device 20 functions described herein, such as determining the content of a message and/or synthesizing a voice recording of the message, for the triggered voice-down event, e.g., based on the one or more identified characteristics, configuration information, etc.

While security control device 20 is illustrated as being a separate device from user interface device 16 (e.g., control panel) and premises device 18, in one or more embodiments, security control device 20 may be integrated with one or more user interface devices 16 and/or premises devices 18 and/or other entity/device located at premises associated with premises security system 12.

Public announcement device 22 may include any device for communicating with persons located in premises 14. For example, public announcement device 22 may include one or more speakers, e.g., placed throughout premises 14, for example, one or more speakers in each room. Public announcement device 22 may include other types of devices for communicating with persons located in premises 14, e.g., a text-based display, a television screen, flashing lights, etc. Public announcement device 22 may be in communication with one or more of network 24, remote monitoring center 26, security control device 20, among other entities in system 10. Public announcement device 22 may be part of premises security system 12, or may be a separate system associated with premises 14 which is configured to receive and play back audio (or other types of media), e.g., a synthesized recording of a voice-down message received from security control device 20 or remote monitoring center 26.

Each public announcement device 22a, 22n, etc., may be associated with (e.g., located in or proximate to) a corresponding premises area 15a, 15n, etc. of premises 14. For example, such association may characterize a public announcement device 22a as being audible (or viewable, etc., depending on the type of device) by a person located in premises area 15a. The associations between public announcement devices 22 and corresponding premises areas 15 may be stored, e.g., in a configuration and/or map data structure in security control device 20, in remote monitoring center 26, in user interface device 16, etc., and may be modifiable by a user (e.g., administrator) of security control device 20, in remote monitoring center 26, in user interface device 16, etc.

Example implementations, in accordance with one or more embodiments, of security control device 20 discussed in the preceding paragraphs will now be described with reference to FIG. 2.

Figure 2:
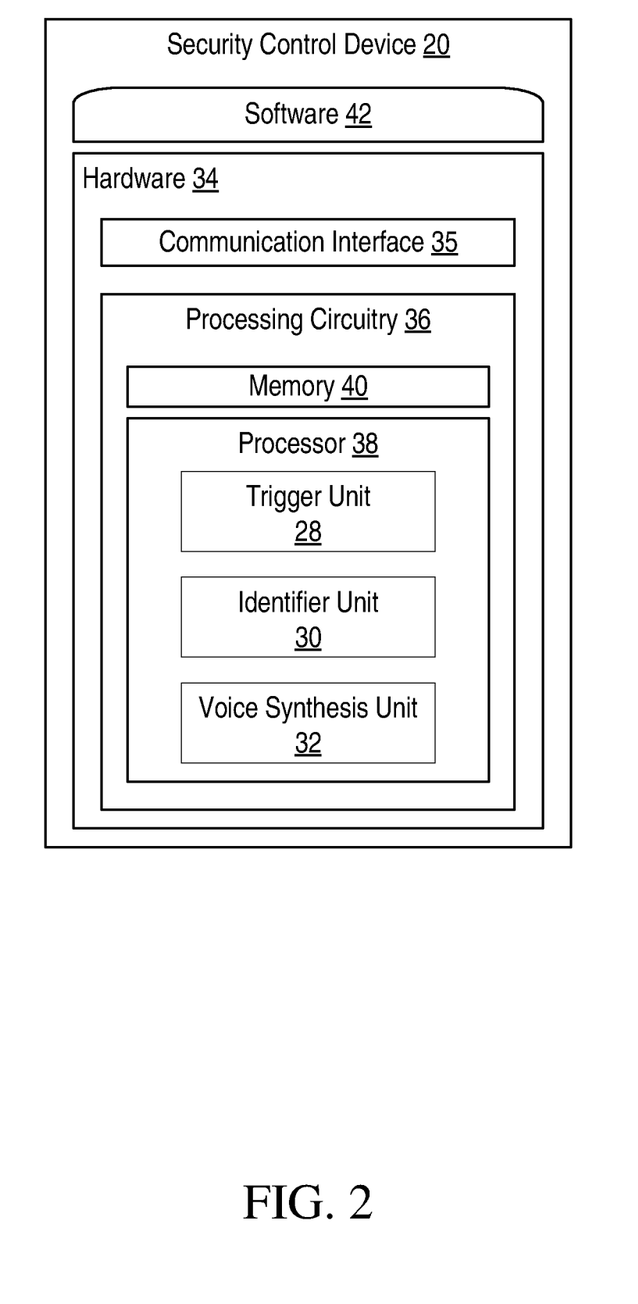
FIG. 2 is a diagram of an example of a security control device according to the principles of the present disclosure.

With respect to FIG. 2, system 10 includes security control device 20 that includes hardware 34 facilitating the security control device 20 to communicate with one or more entities in system 10 and to perform one or more functions described herein. The hardware 34 may include a communication interface 35 for setting up and maintaining at least a wired and/or wireless connection to one or more entities in system 10.

In the embodiment shown, the hardware 34 of the security control device 20 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors, processor cores, field programmable gate arrays (FPGAs), and/or application specific integrated circuits (ASICs) adapted to execute instructions. The processor 38 may be configured to access (e.g., write to and/or read from) the memory 40, which may comprise any kind of volatile and/or nonvolatile memory, e.g., cache, buffer memory, random access memory (RAM), read-only memory (ROM), optical memory, and/or erasable programable read-only memory (EPROM).

The security control device 20 further has software 42 stored internally in, for example, memory 40, or stored in external memory (e.g., database, storage array, network storage device, etc.) accessible by the security control device 20 via an external connection. The software 42 may be executable by the processing circuitry 36. The processing circuitry 36 may be configured to control any of the methods and/or processes described herein and/or to cause such methods, and/or processes to be performed, e.g., by security control device 20. Processor 38 corresponds to one or more processors 38 for performing security control device 20 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to security control device 20. For example, processing circuitry 36 of the security control device 20 may include trigger unit 28 that is configured to perform one or more security control device 20 functions described herein, such as such as receiving sensor data, video surveillance data, and/or biometric data from one or more premises devices 18, receiving other information (e.g., configuration information, security profiles, etc.) from, e.g., memory 40, user interface device 16, remote monitoring center 26, etc., and determining (using, e.g., one or more machine learning models) whether to trigger a voice-down event, as described herein.

As another example, processing circuitry 36 of the security control device 20 may include identifier unit 30 that is configured to perform one or more security control device 20 functions described herein, such as identifying (using, e.g., one or more machine learning models) one or more characteristics of a person and/or other objects, entities, etc. associated with the triggered voice-down event, as described herein. For example, identifier unit 30 may be configured to identify a suspect person, e.g., based on video surveillance data, biometric data, configuration data, security profiles, etc., from premises devices 18 or any other entity of system 10, and may be configured to identify one or more characteristics of the suspect person, e.g., demographic information, name (if determinable based on, e.g., a database of known suspect persons and their associated biometric data, using facial recognition, etc.), a description of their clothing or appearance, a description of an action being performed by the suspect person (e.g., walking, running, climbing, concealing, etc.), or any other characteristic of the suspect person which is identifiable using the one or more machine learning models. As another example, identifier unit 30 may be configured to identify an object (and one or more characteristics thereof) with which a suspect person is interacting, such as an item (e.g., an item for sale in a retail store, a weapon being held by the person or within the vicinity of the person, etc.), or a structural element in the premises area 15, such as a door to a restricted area, a window, a display case, etc. In one example use case, identifier unit 30 may be configured to identify, e.g., based on video surveillance data and/or biometric data of a suspect person, that a suspect person is in a section of the premises area 15 (e.g., an area of a bank branch which is restricted to employees only) in which the suspect person is not permitted to enter, determines the suspect person is a non-employee customer, identifies that the suspect person has walked into the restricted area, and identifies one or more characteristics of the suspect person (e.g., demographic information, description of appearance and clothing, etc.).

Processing circuitry 36 of the security control device 20 may include voice synthesis unit 32 that is configured to perform one or more security control device 20 functions described herein, such as dynamically determining and/or composing a message, e.g., a synthesized voice recording, for the triggered voice-down event, e.g., based on the one or more identified characteristics, as described herein.

Although FIGS. 1-2 show the trigger unit 28, identifier unit 30, and voice synthesis unit 32 as being within a respective processor, each unit may be implemented such that a portion of the unit is stored in a corresponding memory within the processing circuitry. In other words, the unit may be implemented in hardware or in a combination of hardware and software within the processing circuitry. Further, in some embodiments, the trigger unit 28, identifier unit 30, and/or voice synthesis unit 32 may be located in remote monitoring center 26, e.g., instead of or in addition to being located in security control device 20. In other words, in some embodiments, one or more functions described herein with respect to the security control device 20, trigger unit 28, identifier unit 30, and/or voice synthesis unit 32, may be performed remotely in the remote monitoring center 26 and/or other cloud-based computer/server/etc. or other entity of system 10. In some embodiments, trigger unit 28, identifier unit 30, and/or voice synthesis unit 32 may be combined in a single unit, or may be distributed across multiple (e.g., 2, 3, or more) units.

Figure 3:
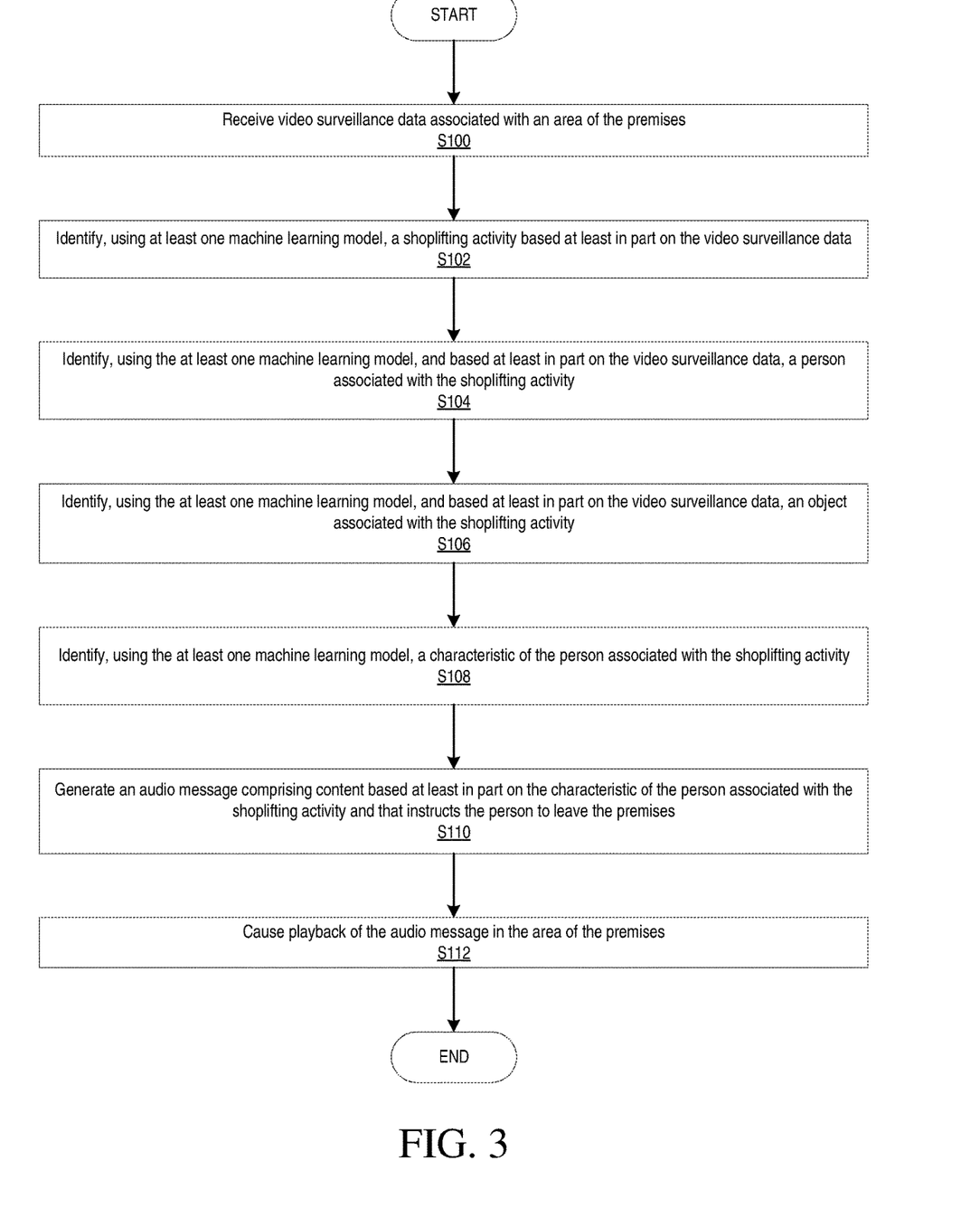
FIG. 3 is a flowchart of an example process according to the principles of the present disclosure.

FIG. 3 is a flowchart of an example process according to some embodiments of the present disclosure. One or more blocks described herein may be performed by one or more elements of security control device 20, such as by one or more of processing circuitry 36 and/or processor 38 (including the trigger unit 28, identifier unit 30, and/or voice synthesis unit 32) and/or communication interface 35. Security control device 20 is configured to receive (Block S100) video surveillance data (e.g., from one or more premises devices 18) associated with an area 15 of the premises 14, as described herein. Security control device 20 is configured to identify (Block S102), using at least one machine learning model, a shoplifting activity based at least in part on the video surveillance data, as described herein. Security control device 20 is configured to identify (Block S104), using the at least one machine learning model, and based at least in part on the video surveillance data, a person associated with the shoplifting activity, as described herein.

Security control device 20 is configured to identify (Block S106), using the at least one machine learning model, an object associated with the shoplifting activity (e.g., an object with which the person is concealing, is handling suspiciously, etc.), as described herein. Security control device 20 is configured to identify (Block S108), using the at least one machine learning model, a characteristic of the person associated with the shoplifting activity, as described herein. In some embodiments, security control device 20 may further be configured to (optionally) identify, using the at least one machine learning model, at least one characteristic of the object associated with the shoplifting activity and/or any other object with which the person is interacting (e.g., a weapon, a door handle, etc.).

Security control device 20 is configured to generate (Block S110 an audio message comprising content based at least in part on the characteristic of the person associated with the shoplifting activity and that instructs the person to leave the premises, as described herein. The content may also, in some embodiments, further include content based on characteristics of the object(s) associated with the shoplifting activity or with which the person is interacting, as described herein. Security control device 20 is configured to cause playback (Block S112) of the audio message in the area 15a of the premises (e.g., using public announcement device 22 with sufficient amplitude of sound and within near enough proximity to area 15a so as to be above an audible threshold for a typical listener in the area 15a), as described herein.

According to one or more embodiments, the at least one characteristic of person associated with the shoplifting activity includes at least one of an item of clothing worn by the person, a gender of the person, a hairstyle of the person, a name of the person, or an identification number associated with the person (e.g., an employee number). In some embodiments, the at least one characteristic may include a description of the item which is being shoplifted by the person associated with the shoplifting activity.

According to one or more embodiments, security control device 20 is further configured to determine a severity level of the shoplifting activity, and synthesize the audio message based at least in part on a vocal profile associated with the severity level (e.g., by synthesizing the voice with a harsher tone, a stricter/sterner/more authoritative sounding vocal profile, etc.).

According to one or more embodiments, the security control device is further configured to detect, using additional surveillance data, a movement of the person from the area 15a to a different area 15b of the premises, to determine an additional severity level based at least in part on the movement of the person and the different area 15b. The security control device 20 is further configured to generate an additional audio message comprising additional content based at least in part on the characteristic of the person associated with the shoplifting activity and the movement of the person from the area to the different area of the premises, synthesize the additional audio message based on an additional vocal profile associated with the additional severity level, and cause playback of the additional audio message in the different area 15b of the premises 14.

Figure 4:
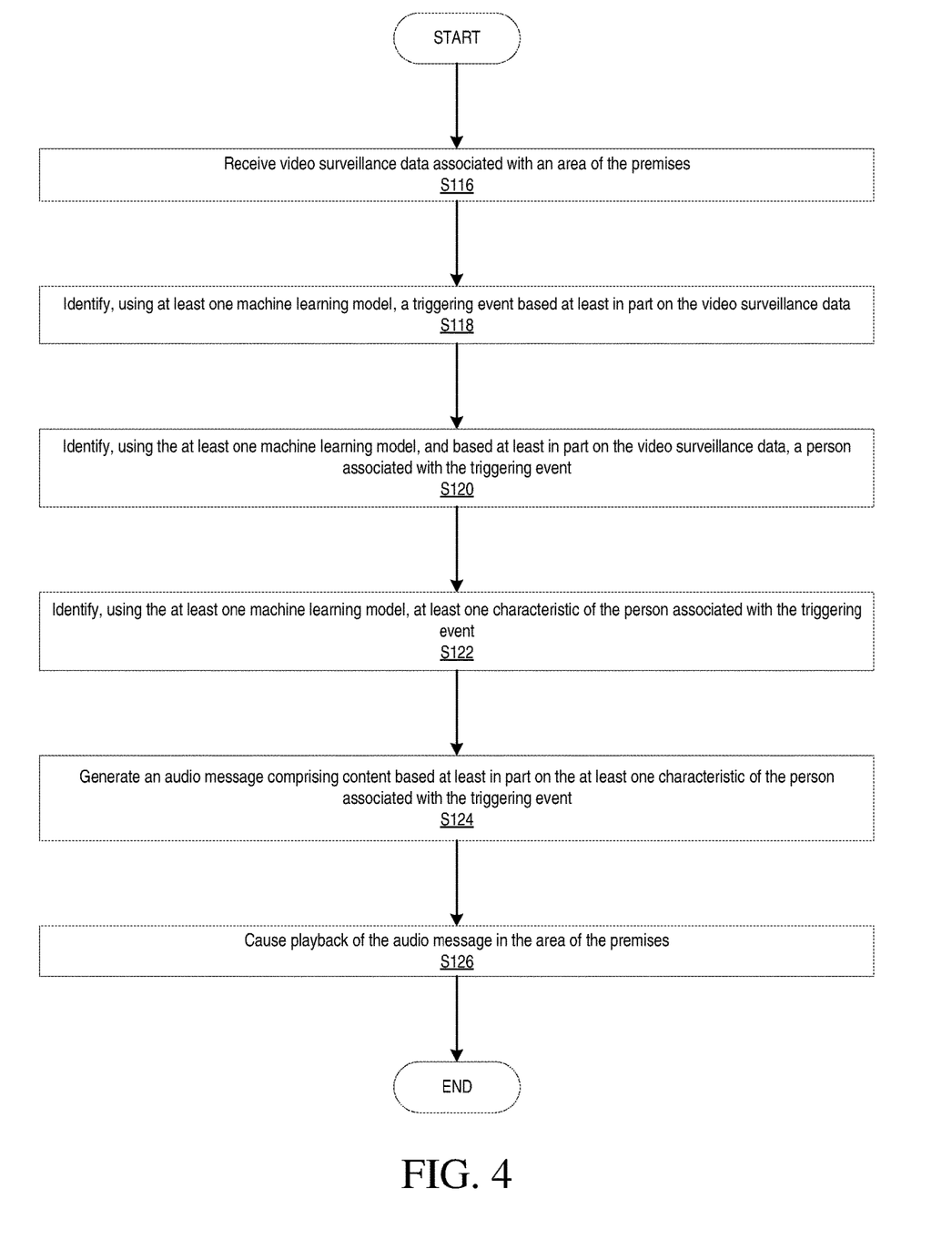
FIG. 4 is a flowchart of another example process according to the principles of the present disclosure.

FIG. 4 is a flowchart of another example process according to some embodiments of the present disclosure. One or more blocks described herein may be performed by one or more elements of security control device 20, such as by one or more of processing circuitry 36 and/or processor 38 (including the trigger unit 28, identifier unit 30, and/or voice synthesis unit 32) and/or communication interface 35. Security control device 20 is configured to receive (Block S116) video surveillance data associated with an area 15 of the premises 14. Security control device 20 is configured to identify (Block S118), using at least one machine learning model, a triggering event (e.g., shoplifting activity, an unpermitted intrusion into a restricted area, a physical altercation, etc.) based at least in part on the video surveillance data. Security control device 20 is configured to identify (Block S120), using the at least one machine learning model, and based at least in part on the video surveillance data, a person associated with the triggering event. Security control device 20 is configured to identify (Block S122), using the at least one machine learning model, at least one characteristic of the person associated with the triggering event. Security control device 20 is configured to generate (Block S124) an audio message comprising content based at least in part on the at least one characteristic of the person associated with the triggering event. Security control device 20 is configured to cause playback (Block S126) of the audio message in the area 15 of the premises 14.

According to one or more embodiments, security control device 20 is further configured to identify, using the at least one machine learning model, an object with which the person is interacting, and generate the audio message such that the content further includes information based at least in part on the object with which the person is interacting. According to one or more embodiments, the at least one characteristic of person associated with the triggering event includes at least one of an item of clothing worn by the person, a gender of the person, a name of the person, a hairstyle of the person, an identification number of the person (e.g., an employee identification number), an identification of an object with which the person is interacting, and/or a type of a weapon being held by the person.

According to one or more embodiments, the security control device 20 is further configured to receive biometric data associated with the triggering event, and identify the person associated with the triggering event further based at least in part on the biometric data (e.g., in addition to using the video surveillance data), which may include, e.g., identifying the at least one characteristic of the person associated with the triggering event based at least in part on the biometric data (e.g., in addition to using the video surveillance data).

According to one or more embodiments, the security control device 20 is further configured to determine a severity level of the triggering event, and synthesize the audio message based at least in part on a vocal profile associated with severity level.

According to one or more embodiments, the security control device 20 is further configured to detect, using additional surveillance data, a movement of the person from the area 15a to a different area 15b of the premises 14, determine an additional severity level based at least in part on the detected movement of the person and at least one characteristic of the different area 15b (e.g., the different area 15b being restricted to employees only, the different area 15b being nearer to an exit, etc.), generate an additional audio message including additional content based at least in part on the at least one characteristic of the person associated with the triggering event and the movement of the person, synthesize the additional audio message based on an additional vocal profile associated with the additional severity level, and cause playback of the additional audio message in the different area 15b of the premises 14. According to one or more embodiments, the additional severity level is either a higher severity level than the severity level when the different area 15b is farther from an exit of the premises 14 than the area 15a, or a lower severity level than the severity level when the different area 15b is closer to the exit of the premises 14 than the area 15a. Other reference points within a building other than an exit may be used, e.g., increasing a severity level as a person moves closer to a restricted area, and decreasing the severity level as the person moves farther from the restricted area.

Some embodiments of the present disclosure may be described according to the following examples.

Premises security system 12 users (e.g., retail store operators) may in some cases prefer that a VD message played by public announcement device 22 appear to be "live" and spoken or otherwise issued by a human monitoring agent, e.g., by periodically changing the message. For example, in systems using a human monitoring agent, a different human monitoring agent (each with recognizably different vocal characteristics) may be instructed to perform the VD message, e.g., every hour. As another example, in systems using pre-recorded voice messages, the public announcement device 22 may be configured to play a different sounding voice recording, e.g., every hour. Thus, some systems may be configured to demonstrate (or in some cases, pretend) to persons, such as employees, customers, visitors, guests, etc. at the premises 14 that a "live" agent is performing the VD message, whereas if the same human monitoring agent performed the VD message, or if the same or similar voice recording is played, the person may believe the VD message is pre-recorded.

For example, premises security system 12 users (e.g., a premises security administrator, a retail store manager, etc.) may desire that the premises security system 12 provide one or more features that give the appearance or impression to a person in the premises 14, such as an employee, customer, visitor, etc. of the premises 14, that there is a live agent monitoring video surveillance, e.g., by configuring the system to modify the operator voice of the VD message, to provide more frequent announcements, to provide a message which sounds "natural" and not scripted or robotic, include information suggesting the message is live, such as the date and/or time, to utilize different voices throughout the day, etc. Thus, various embodiments of the present disclosure may be configured such that the person in the premises 14 (e.g., a customer under surveillance) may be more likely to believe (correctly or otherwise) that the VD messages are being issued by a live, local, human monitoring agent (e.g., a security guard located in premises 14 who is watching a video surveillance feed of the customer).

In some embodiments, trigger unit 28 may be configured to receive, process, combine, etc., sensor data (e.g., video surveillance data, motion sensor data, biometric data, etc., from one or more premises devices 18), which may be used to identify suspicious behavior or other triggering activities. Trigger unit 28 may identify and/or determine a triggering event is occurring based at least in part on the sensor data. A triggering event may trigger playback (and/or display, etc.) of a VD message (e.g., dynamically composed VD message) via public announcement device 22, as described herein. Trigger unit 28 may be configured, and/or may be configured to utilize, one or more machine learning models (and/or other artificial intelligence and/or statistical modeling techniques) to determine whether a triggering event (e.g., a prohibited activity, such as engaging in shoplifting activity, a person engaging in theft activity, a presence or brandishing of weapons, an act of violence, threatening behavior, safety related event, loitering, fighting, engaging in vandalism, etc.), is occurring in premises 14 and/or a premises area 15. In some embodiments, the machine learning model(s) may determine one or more probability values associated with a candidate triggering event, e.g., based on the sensor data. The machine learning model may have been previously trained based on training data such as sensor data associated with triggering event labels. The machine learning model may be able to determine a probability corresponding to whether a triggering event is occurring (e.g., a probability p of a triggering event occurring), and/or may be able to determine a probability corresponding to whether a certain type of triggering event is occurring (e.g., a probability pi corresponding to a shoplifting triggering event, a probability $p_2$ corresponding to a violence triggering event, etc.). In some embodiments, the trigger unit 28 may be configured with one or more threshold value(s) x for comparison with the probability values x determined by the machine learning model. For example, where the machine learning model determines, using at least the sensor data inputs (e.g., video camera streams from premises devices 18), a probability value p that a triggering activity is occurring, the trigger unit 28 may cause a trigger to occur where p exceeds x. The thresholds may vary for each type of triggering event, e.g., a shoplifting triggering event may have a higher threshold xi than a violence event $x_2$, which may be configurable, e.g., by an administrator user. In some embodiments, trigger unit 28 may be configured to be triggered by an intentional user input via user interface device 16, e.g., a store employee may observe suspicious or threatening activity, and may push a button on user interface device 16 or say a triggering catch phrase (e.g., "Code 27", "Clear my 515 panel", etc.) which may be sensed by user interface 16 and/or a premises device 18 (e.g., using a microphone and speech recognition hardware/software), and which may cause the trigger unit 28 to determine a triggering event, e.g., to trigger a VD message. In some embodiments, trigger unit 28 may communicate an indication to the identifier unit 30 and/or voice synthesis unit 32, and/or any other entity of system 10, which may provide, e.g., one or more characteristics, parameters, etc., of the sensor data or other information (e.g., user inputs, voice commands, machine learning model outputs, triggering event types, etc.) associated with the triggering event.

In some embodiments, identifier unit 30 may be configured to determine, gather, identify, etc., additional information regarding the triggering event. For example, if the triggering event is "shoplifting activity," the identifier unit 30 may receive, determine, and/or gather characteristics (i.e., information) about the triggering event, such as person(s)/suspect(s) associated with the triggering event, items/objects associated with the triggering event, premises area(s) 15 associated with the triggering event, etc. Identifier unit 30 may receive the characteristics associated with the triggering event from the trigger unit 28 and/or may request additional information (such as additional video data, additional sensor data, additional biometric data, etc.), e.g., from one or more premises devices 18 associated with the triggering event and/or associated with the premises area 15 associated with the triggering event. Identifier unit 30 may use a machine learning model (and/or other artificial intelligence and/or statistical modeling techniques) to identify the characteristics associated with the triggering event based on the sensor data and any other additional information received by the identifier unit 30. For example, the identifier unit 30 may use a machine learning model that may be trained based on a variety of data sets, such as images/video of people, objects, etc. (e.g., for recognizing features of a person, identifying a type of object and other adjectives to describe it, for recognizing human behavior such as violence, identifying objects used for stealing (e.g., a foil-lined bag), etc.), voice/speech data (e.g., for recognizing speech patterns or vocal features, etc.). The identifier unit 30 may be configured to identify certain characteristics depending on what type of triggering event is being analyzed. For example, for a shoplifting activity triggering event, the identifier unit 30 may be configured to identify characteristics associated with a person suspected to be a person engaging in shoplifting activity, items for sale (e.g., high value items) which are in the proximity of the suspect, etc. As another example, for a violence triggering event, the identifier unit 30 may be configured to identify an assailant and a victim, characteristics of the assailant and/or victim, characteristics of any weapons brandished by the assailant, etc. As another example, for a shoplifting triggering event, the identifier unit 30 may be configured to identify one or more objects and/or characteristics of the object(s) used for stealing such as a foil-lined bag, a particular tool (e.g., pilers), etc.

In some embodiments, the identifier unit 30 machine learning model may be configured to determine probability values associated with various features/characteristics identified from the sensor data and/or other information, such as descriptions of a person associated with a triggering event (e.g., the color of various clothing items worn by the suspect, hair style, etc.), a description of an object associated with the triggering event (e.g., an item type and/or other description information, such as a "gold wristwatch"), a description of a location of the person (e.g., a premises area 15 description, such as "Aisle 8" or "Electronics Department"), etc.

In some embodiments, the voice synthesis unit 32 may be configured to dynamically generate and/or compose a VD message or other communication (e.g., a text or video message). In some embodiments, the voice synthesis unit 32 may be configured to utilize a machine learning model (and/or other artificial intelligence and/or statistical modeling techniques). The machine learning model may utilize input data such as sensor data, location metadata, etc. from the premises devices 18 (e.g., surveillance cameras with metadata "Aisle 5") and/or may utilize descriptive information from the Identifier unit 30 (and/or Trigger unit 28). In some embodiments, the voice synthesis unit 32 may be configured to dynamically generate and cause playback of a dynamically generated VD message via public announcement device 22. The voice synthesis unit 32 may utilize a variety of techniques for generating natural language speech providing phrases using information determined by identifier unit 30 such as phrases which identify the triggering event, characteristics/descriptors associated with the triggering event (e.g., the suspect, the items being shoplifted, the location, etc.), and/or other phrase elements which give the appearance/impression that the phrase is spoken by a live security agent/monitor.

As an example use case, a trigger unit 28 may receive video data from premises devices 18 corresponding to surveillance of a customer. Based on the video data, and using a machine learning model that has been trained on video surveillance training data associated with corresponding triggering event labels, the trigger unit 28 determines a potential shoplifting event is occurring. The identifier unit 30 uses a machine learning model, which has been trained to recognize characteristics of people, objects, etc., in video surveillance data or other premises device 18 data (e.g., sensor data), such as descriptions of the suspect (e.g., red shirt, male, etc.), the item being stolen (e.g., wristwatch), etc. The voice synthesis unit 32 dynamically determines, composes and/or generates a phrase (e.g., "Shoplifting of wristwatch detected in Aisle 5. Gentleman in red shirt, please leave the store."), and may apply vocal characteristics (e.g., various accents, speech cadences, etc.) to provide a spoken phrase which appears live, human, and/or non-scripted.

In some embodiments, the voice synthesis unit 32 may be configurable by an administrator user. For example, the user may select a "sternness" level, which may configure the voice synthesis unit 32 to apply a particular type of speech pattern, cadence, style, accent, gender, tone, etc. to the VD message and/or voice. As another example, the voice synthesis unit 32 may be configured, for repeated/multiple VD messages addressing an on-going triggering event, to alter the speech pattern with each additional VD message (e.g., increase the "sternness" of the message and/or voice, instructing the suspect person to leave the premises 14 on the third VD message, notifying the suspect that the police are on their way in the fourth VD message, etc.).

In some embodiments, the identifier unit 30 may be configured to comply with one or more government regulations and/or company anti-discrimination policies, e.g., to avoid including/considering one or more of gender, race, age, etc., as identifying characteristics.

Thus, for example, the trigger unit 28 may determine a context (e.g., shoplifting), the identifier unit 30 may determine identifiable information associated with the context (e.g., a red T-shirt worn by a shoplifting suspect), and the voice synthesis unit 32 may determine a script and/or voice playback features based thereon.

Although embodiments herein may be described with respect to a trigger unit 28, identifier unit 30, and voice synthesis unit 32 in a security control device 20 located in a premises security system 12, any one or more of the configurations, features, and processes described herein may be performed by a single unit, processor, device, etc., or may be distributed across multiple units, processors, devices, etc., including devices within premises security system 12 as well as remote devices (e.g., remote monitoring center 26). In some embodiments, trigger unit 28, identifier unit 30, and/or voice synthesis unit 32 may be located in one or more other devices instead of or in addition to security control device 20, e.g., in a premises device 18, public announcement device 22, remote monitoring center 26, etc. For example, in some embodiments, remote monitoring center 26 may provide one or more of the above processes (e.g., if a connection from premises security system 12 to remote monitoring center 26 is available, a server in remote monitoring center 26 may provide one or more of the processing, machine learning, etc. described herein, instead of or in addition to the units/processors/etc. of security control device 20).

In some embodiments, the machine learning models may be pre-trained, e.g., using training data sets specific to security systems, such as for identifying triggering events, and/or using more general data sets, such as for identifying characteristics of people, items, objects, actions, etc., in video surveillance data or other sensor information from premises devices 18.

In some embodiments, trigger unit 28, identifier unit 30, and/or voice synthesis unit 32 may include a variety of machine learning models. For example, for the trigger unit 28, a first model may be trained to identify weapons, another model may be trained to identify behavior (e.g., shoplifting, aggression, etc.), another model may be trained to identify characteristics of speech of people under surveillance, another model may train to identify gunshots, etc. As another example, for the identifier unit 30, a first model may be trained for a clothing identification, another model may be trained for gender identification, etc. As another example, the voice synthesis unit 32 may include a first model for determining voice tone, another model for determining speech cadence, another model for determining speech content, etc. In some embodiments, the voice synthesis unit 32 may be configurable to utilize one or more languages, e.g., English, French, etc. In some embodiments, the language selected by voice synthesis unit 32 may be based on a user configuration (e.g., an administrator user in Miami, Florida setting the language for all VD messages to be in both Spanish and English). In some embodiments, the language selected by voice synthesis unit 32 may be based on identifier unit 30 identifying (e.g., based on video surveillance data from premises devices 18) that the suspect is speaking a particular language, and the voice synthesis unit 32 determining to dynamically generate a VD message in that language accordingly. In some embodiments, voice synthesis unit 32 may be configured to synthesize speech with a particular regional accent, e.g., a Southern American accent in Georgia, and Midwestern accent in Wisconsin, etc., e.g., based on premises 14 location information and/or user configuration settings. Other features of the VD message synthesized by voice synthesis unit 32 may be context dependent, location dependent, etc. For example, in a daycare setting or a theme park setting, the VD message may utilize a child-like or cartoonish voice. In an industrial warehouse setting, the VD message may utilize stern voice. In a convention center setting, the VD message may utilize a business voice.

In some embodiments, the trigger unit 28, identifier unit 30, and/or voice synthesis unit 32 may utilize premises device 18 data (e.g., video surveillance data, motion sensors, etc.) to track movement of a suspect, object, etc., throughout premises 14. For example, following a first VD message warning a suspect to leave the store, one or more of the trigger unit 28, identifier unit 30, and/or voice synthesis unit 32 may determine that the suspect has moved from premises area 15a (e.g., the interior of the store) to premises area 15b (e.g., nearing the exit of the store) to premises area 15c (e.g., an outdoor parking lot). Voice synthesis unit 32 may be configured to then adjust (e.g., a severity level of) the next VD message(s) accordingly (e.g., "Thank you for leaving."), or to refrain from further VD messages (e.g., after confirming that the suspect is no longer in the premises 14). In some embodiments, drones or unmanned aerial vehicles (UAVs) may be utilized as one or more premises devices 18 for collecting video surveillance. In some embodiments, drones or UAVs may be utilized as public announcement devices 22.

In some embodiments, trigger unit 28 and/or identifier unit 30 may be configured (e.g., may have one or more machine learning models appropriately trained) to distinguish employees from customers or other non-employee visitors to premises 14, for example, based on biometric recognition, recognizing uniforms worn by employees, etc. This information may be utilized, e.g., for determining whether a video surveillance data corresponds to a customer shoplifting (a triggering event) or an employee restocking shelves (a non-triggering event).

In some embodiments, one or more of trigger unit 28, identifier unit 30, and/or voice synthesis unit 32 may be configured to support further training of one or more machine learning models, e.g., based on feedback from administrator users. For example, an administrator user may be able to provide feedback (e.g., via user interface device 16) as to whether a triggering event (e.g., shoplifting) was a false alarm. This feedback may be used to further refine the machine learning model for identifying that triggering event in the future.

Thus, one or more embodiments of the present disclosure may advantageously reduce the need for (live) human intervention for performing the VD messages, saving significant agent time and resources, and providing potentially 24 hour service with minimal cost compared to existing systems.

The concepts described herein may be embodied as a method, data processing system, computer program product and/or computer storage media storing an executable computer program. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams may include arrows on communication paths to show a primary direction of communication, communication may occur in the opposite direction of the depicted arrows.

Computer program code for carrying out operations of the concepts described herein may be written in an object-oriented programming language, such as Python, Java® or C++. However, the computer program code for carrying out operations of the disclosure may also be written in procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, all of the accompanying drawings are not to scale. A variety of modifications and variations are possible in light of the above teachings and present disclosure.

What is claimed is:

1. A control device in a premises security system for a premises, the control device comprising processing circuitry configured to:
   receive video surveillance data associated with an area of the premises;
   identify, using at least one machine learning model, a shoplifting activity based at least in part on the video surveillance data;
   identify, using the at least one machine learning model, and based at least in part on the video surveillance data, a person associated with the shoplifting activity;
   identify, using the at least one machine learning model, and based at least in part on the video surveillance data, an object associated with the shoplifting activity;
   identify, using the at least one machine learning model, a characteristic of the person associated with the shoplifting activity;
   generate an audio message comprising content based at least in part on the characteristic of the person associated with the shoplifting activity and that instructs the person to leave the premises;
   cause playback of the audio message in the area of the premises;
   determine a severity level of the shoplifting activity;
   detect, using additional surveillance data, a movement of the person from the area to a different area of the premises;
   determine an additional severity level based at least in part on the movement of the person and the different area;
   the additional severity level being one of:
      a higher severity level than the severity level when the different area is farther from an exit of the premises than the area; or
      a lower severity level than the severity level when the different area is closer to the exit of the premises than the area; and
   cause playback of an additional audio message based on the additional severity level.

2. The control device of claim 1, wherein the characteristic of the person associated with the shoplifting activity comprises at least one of:
   an item of clothing worn by the person;
   a gender of the person;
   a hairstyle of the person;
   a name of the person; or
   an identification number associated with the person.

3. The control device of claim 1, wherein the processing circuitry is further configured to:
   synthesize the audio message based at least in part on a vocal profile associated with the severity level.

4. The control device of claim 3, wherein the processing circuitry is further configured to:
   generate the additional audio message comprising additional content based at least in part on the characteristic of the person associated with the shoplifting activity and the movement of the person from the area to the different area of the premises;
   synthesize the additional audio message based on an additional vocal profile associated with the additional severity level; and
   cause playback of the additional audio message in the different area of the premises.

5. A control device in a premises security system for a premises, the control device comprising processing circuitry configured to:
   receive video surveillance data associated with an area of the premises;
   identify, using at least one machine learning model, a triggering event based at least in part on the video surveillance data;
   identify, using the at least one machine learning model, and based at least in part on the video surveillance data, a person associated with the triggering event;
   identify, using the at least one machine learning model, at least one characteristic of the person associated with the triggering event;
   generate an audio message comprising content based at least in part on the at least one characteristic of the person associated with the triggering event;
   cause playback of the audio message in the area of the premises;
   determine a severity level of the triggering event;
   detect, using additional surveillance data, a movement of the person from the area to a different area of the premises;
   determine an additional severity level based at least in part on the movement of the person and at least one characteristic of the different area;
   the additional severity level being one of:
      a higher severity level than the severity level when the different area is farther from an exit of the premises than the area; or
      a lower severity level than the severity level when the different area is closer to the exit of the premises than the area; and
   cause playback of an additional audio message based on the additional severity level.

6. The control device of claim 5, wherein the processing circuitry is further configured to:
   determine, using the at least one machine learning model, an event type associated with the triggering event;
   identify the person associated with the triggering event further based at least in part on the event type; and
   generate the audio message such that the content further comprises information based at least in part on the event type.

7. The control device of claim 5, wherein:
   the processing circuitry is further configured to:
   identify, using the at least one machine learning model, an object with which the person is interacting; and
   generate the audio message such that the content further comprises information based at least in part on the object with which the person is interacting.

8. The control device of claim 5, wherein the at least one characteristic of person associated with the triggering event includes at least one of:
   an item of clothing worn by the person;
   a gender of the person;
   a name of the person;
   a hairstyle of the person;
   an identification number of the person;
   an identification of an object with which the person is interacting; or
   a type of a weapon being held by the person.

9. The control device of claim 5, wherein the processing circuitry is further configured to:

receive biometric data associated with the triggering event; and identify the person associated with the triggering event further based at least in part on the biometric data.

10. The control device of claim 5, wherein the processing circuitry is further configured to:

synthesize the audio message based at least in part on a vocal profile associated with severity level.

11. The control device of claim 10, wherein the processing circuitry is further configured to:

generate the additional audio message comprising additional content based at least in part on the at least one characteristic of the person associated with the triggering event and the movement of the person;

synthesize the additional audio message based at least in part on an additional vocal profile associated with the additional severity level; and cause playback of the additional audio message in the different area of the premises.

12. A method implemented in a control device in a premises security system for a premises, the method comprising:

receiving video surveillance data associated with an area of the premises;

identifying, using at least one machine learning model, a triggering event based at least in part on the video surveillance data;

identifying, using the at least one machine learning model, and based at least in part on the video surveillance data, a person associated with the triggering event;

identifying, using the at least one machine learning model, at least one characteristic of the person associated with the triggering event;

generate an audio message comprising content based at least in part on the at least one characteristic of the person associated with the triggering event; and causing playback of the audio message in the area of the premises determining a severity level of the triggering event;

detecting, using additional surveillance data, a movement of the person from the area to a different area of the premises;

determining an additional severity level based at least in part on the movement of the person and at least one characteristic of the different area;

the additional severity level being one of:

a higher severity level than the severity level when the different area is farther from an exit of the premises than the area; or a lower severity level than the severity level when the different area is closer to the exit of the premises than the area; and causing playback of an additional audio message based on the additional severity level.

13. The method of claim 12, wherein the method further comprises:

determining, using the at least one machine learning model, an event type associated with the triggering event;

identifying the person associated with the triggering event further based on the event type; and generating the audio message such that the content further comprises information based at least in part on the event type.

14. The method of claim 12, wherein the method further comprises:

identifying, using the at least one machine learning model, an object with which the person is interacting; and generating the audio message such that the content further comprises information based at least in part on the object with which the person is interacting.

15. The method of claim 12, wherein the at least one characteristic of person associated with the triggering event includes at least one of:

an item of clothing worn by the person;
a gender of the person;
a name of the person;
a hairstyle of the person;
an identification number of the person;
an identification of an object with which the person is interacting; or
a type of a weapon being held by the person.

16. The method of claim 12, wherein the method further comprises:

receiving biometric data associated with the triggering event; and identifying the person associated with the triggering event further based at least in part on the biometric data.

17. The method of claim 12, wherein the method further comprises:

synthesizing the audio message based at least in part on a vocal profile associated with severity level.

18. The method of claim 17, wherein the method further comprises:

generating the additional audio message comprising additional content based at least in part on the at least one characteristic of the person associated with the triggering event and the movement of the person;

synthesizing the additional audio message based at least in part on an additional vocal profile associated with the additional severity level; and causing playback of the additional audio message in the different area of the premises.

* * * * *